(12) United States Patent
Schaeffer et al.

(10) Patent No.: US 9,322,490 B2
(45) Date of Patent: Apr. 26, 2016

(54) MICRO-VALVE AND SEALING DEVICE FOR USE IN A MICROFLUIDIC SYSTEM, AND METHOD FOR THE PRODUCTION THEREOF

(75) Inventors: Eva Schaeffer, Mainz (DE); Volkmar Stein, Ginsheim-Gustavsburg (DE)

(73) Assignee: FRAUNHOFER-GESELLSCHAFT ZUR FÖRDERUNG DER ANGEWANDTEN FORSCHUNG E. V., München (DE)

( * ) Notice: Subject to any disclaimer, the term of this patent is extended or adjusted under 35 U.S.C. 154(b) by 566 days.

(21) Appl. No.: 12/737,277

(22) PCT Filed: Jun. 19, 2009

(86) PCT No.: PCT/EP2009/004456
§ 371 (c)(1),
(2), (4) Date: Jan. 31, 2011

(87) PCT Pub. No.: WO2009/156103
PCT Pub. Date: Dec. 30, 2009

(65) Prior Publication Data
US 2011/0114869 A1 May 19, 2011

(30) Foreign Application Priority Data

Jun. 26, 2008 (DE) .......................... 10 2008 002 674

(51) Int. Cl.
*F16K 99/00* (2006.01)
*B01L 3/00* (2006.01)

(52) U.S. Cl.
CPC ....... *F16K 99/0001* (2013.01); *B01L 3/502738* (2013.01); *F16K 99/0013* (2013.01);

(Continued)

(58) Field of Classification Search
CPC ....... F16K 17/06; F16K 17/04; F16K 15/026; Y10T 137/7929
USPC .......................... 251/208, 209, 214, 304, 368
See application file for complete search history.

(56) References Cited

U.S. PATENT DOCUMENTS 3,472,283 A * 10/1969 Christiansen ............... 137/636.3
3,913,834 A * 10/1975 Supper ..................... 237/12.3 A (Continued)

FOREIGN PATENT DOCUMENTS

DE        4221089 A1    1/1994
DE       19948613 A1    4/2001

(Continued)

OTHER PUBLICATIONS

Hasegawa, et al., Multi-Directional Micro-Switching Valve Chip with Rotary Mechanism, ScienceDirect, Sensors and Actuators A 143, 2008, pp. 390-398, Elsevier B.V.
(Continued)

Primary Examiner — Marina Tietjen
Assistant Examiner — Daphne M Barry
(74) Attorney, Agent, or Firm — Hudak, Shunk & Farine Co. LPA

(57) ABSTRACT

A micro-valve for controlling fluid flows and a sealing device for sealing off cavities in a microfluid system, in particular in a lab-on-a-chip system, and also a method for the production thereof. A valve body or a sealing element bears with a sealing surface against a sealing surface of a substrate, the valve body or the sealing element is pressed with the sealing surface thereof in a fluid-tight manner against the sealing surface of the substrate by means of a pressure-exerting ring, and the pressure-exerting ring is cohesively connected to the substrate. The pressure-exerting ring and/or the valve body or the sealing element are at least partially elastic.

21 Claims, 6 Drawing Sheets

(52) U.S. Cl.
CPC .. *B01L2200/0689* (2013.01); *B01L 2300/0816* (2013.01); *B01L 2400/0622* (2013.01); *B01L 2400/0644* (2013.01); *F16K 2099/0084* (2013.01); *Y10T 29/49412* (2015.01); *Y10T 29/49425* (2015.01)

(56) References Cited

U.S. PATENT DOCUMENTS

| | | | |
|---|---|---|---|
| 3,961,749 A * | 6/1976 | Orcutt | 236/101 D |
| 4,115,276 A * | 9/1978 | Kelly | 210/425 |
| 4,428,511 A * | 1/1984 | Howell | 222/309 |
| 4,997,006 A * | 3/1991 | Zlobinsky et al. | 137/625.21 |
| 5,149,054 A * | 9/1992 | Passerell et al. | 251/309 |
| 5,393,014 A * | 2/1995 | Weisend | 244/134 A |
| 5,571,410 A | 11/1996 | Swedberg et al. | |
| 5,616,300 A * | 4/1997 | Ford et al. | 422/540 |
| 6,520,434 B1 * | 2/2003 | Reiter | 239/585.5 |
| 6,748,975 B2 * | 6/2004 | Hartshorne et al. | 137/625.46 |
| 6,845,968 B2 * | 1/2005 | Killeen et al. | 251/304 |
| 2003/0152489 A1 | 8/2003 | Gueller et al. | |
| 2006/0054849 A1 * | 3/2006 | Brennen | 251/129.11 |
| 2006/0180223 A1 * | 8/2006 | Broyer et al. | 137/828 |
| 2007/0025887 A1 * | 2/2007 | Baeuerle et al. | 422/104 |
| 2007/0034820 A1 * | 2/2007 | Murphy et al. | 251/148 |
| 2007/0144594 A1 * | 6/2007 | Moon et al. | 137/625.46 |
| 2009/0321356 A1 * | 12/2009 | Gerhardt et al. | 210/656 |
| 2010/0124688 A1 * | 5/2010 | Brandon | 429/34 |
| 2011/0104024 A1 * | 5/2011 | Gransee et al. | 422/502 |

FOREIGN PATENT DOCUMENTS

| | | |
|---|---|---|
| DE | 102 27 593 A1 | 2/2003 |
| EP | 1 350 759 A2 | 10/2003 |
| WO | 01 86155 A1 | 11/2001 |
| WO | 2008 053751 A1 | 5/2008 |

OTHER PUBLICATIONS

Hasegawa, et al., 10-Way Micro Switching Valve Chip for Multi-Directional Flow Control, 7th International Conference on Miniaturized Chemical and Biochemical Analysis Systems, Oct. 5-9, 2003, Squaw Valley, CA, USA pp. 215-218.

Schaeffer et al., Rotating Valves Allowing Bubble-free Metering and Mixing, MipTec, 9th International Conference & Exhibition on Drug Discovery, May 9, 2006.

* cited by examiner

Fig. 1 (STATE OF THE ART)

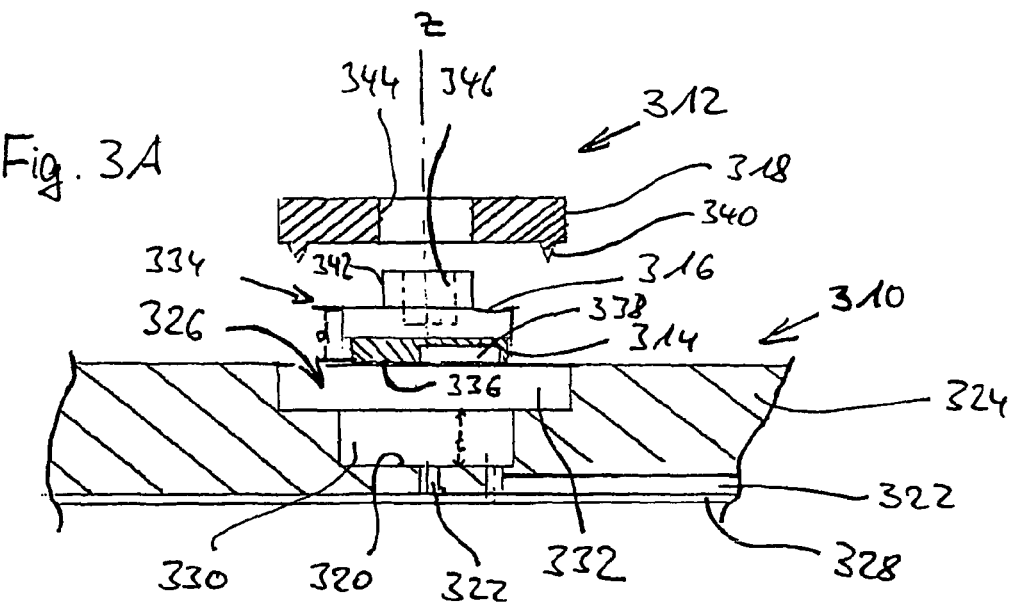
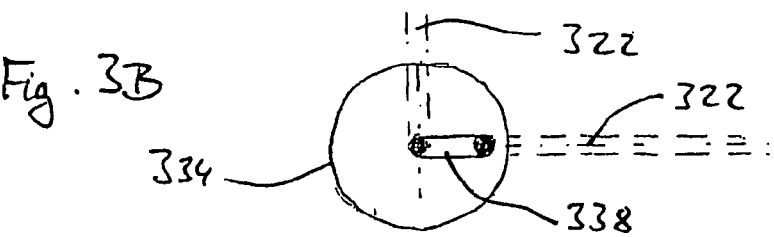
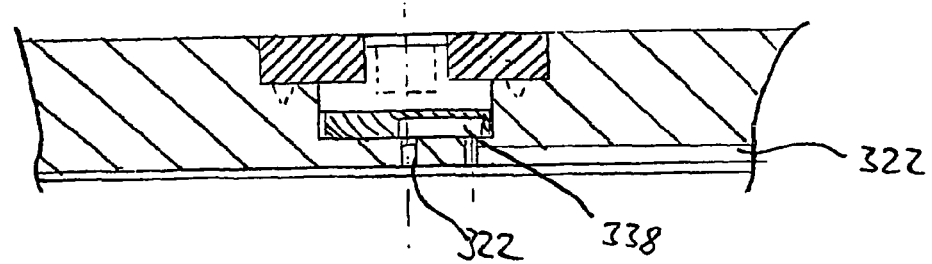
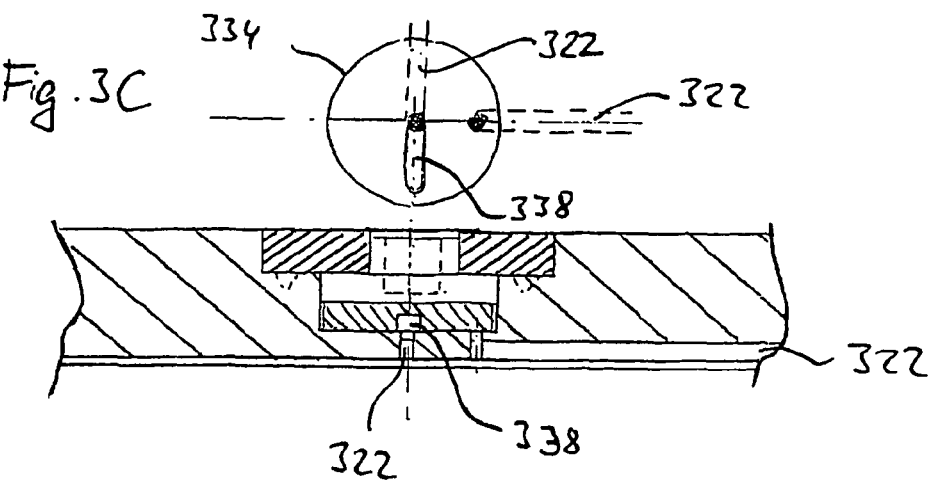

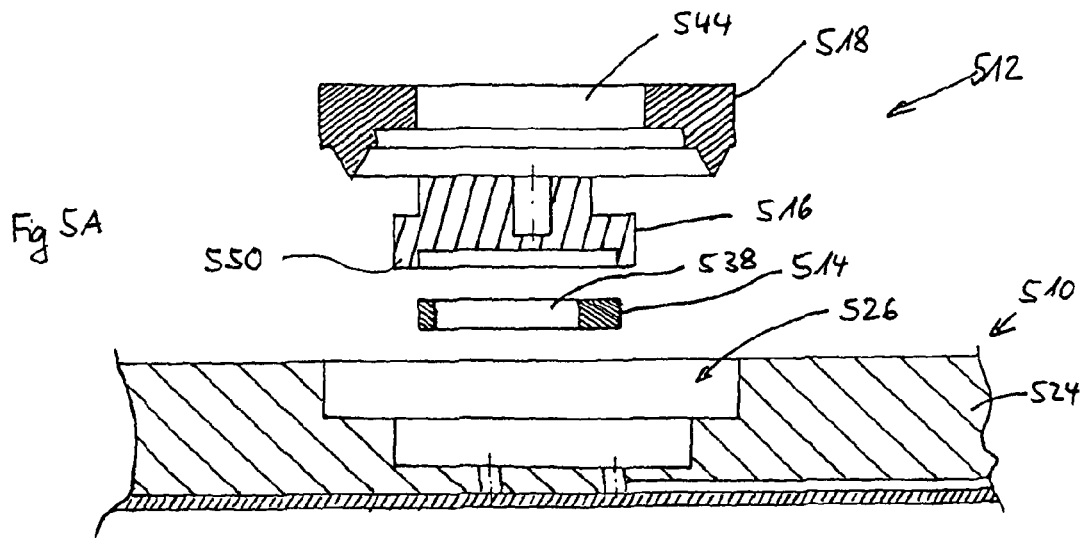
Fg 5A
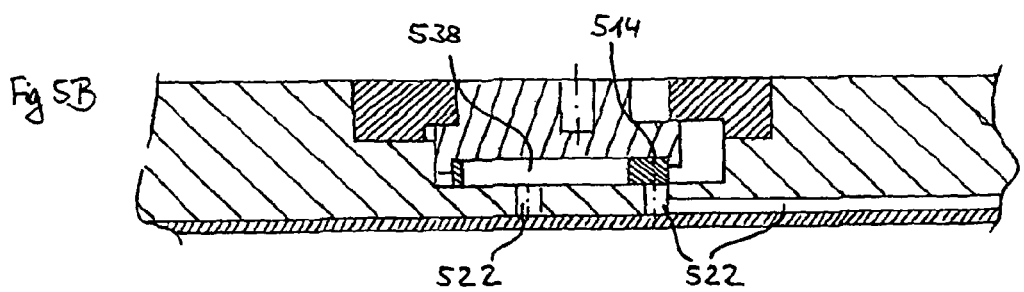
Fg 5B
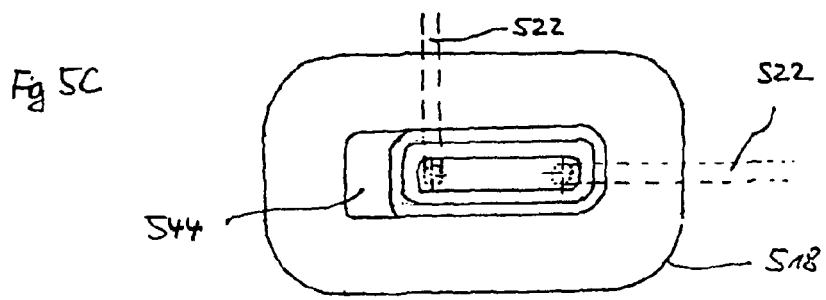
Fg 5C
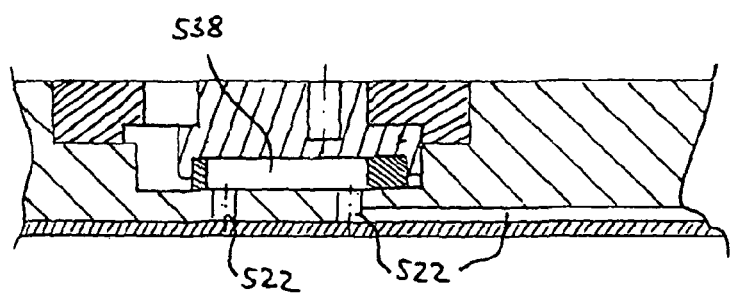

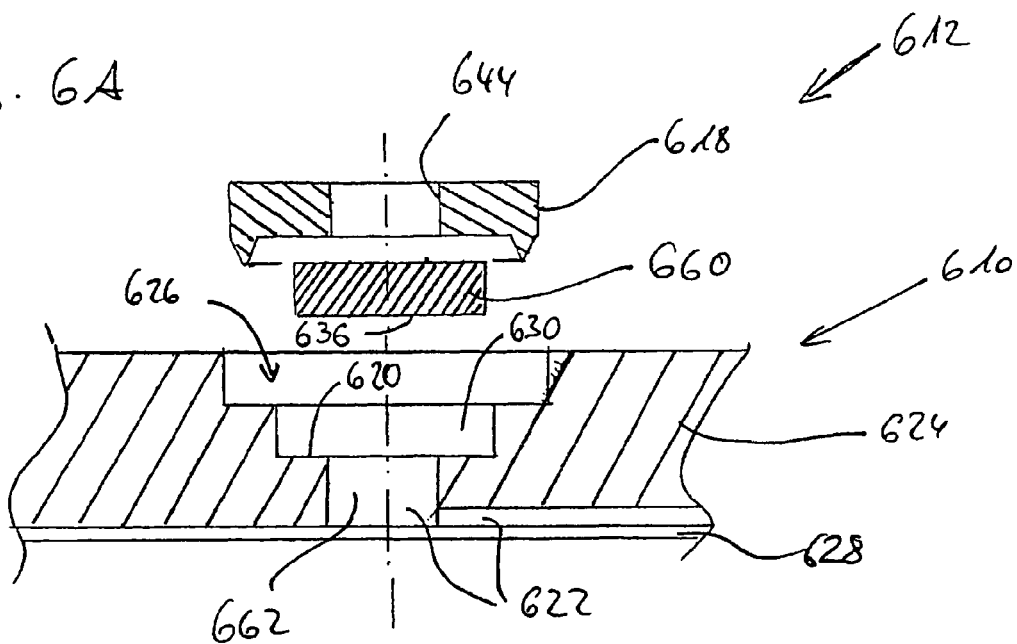
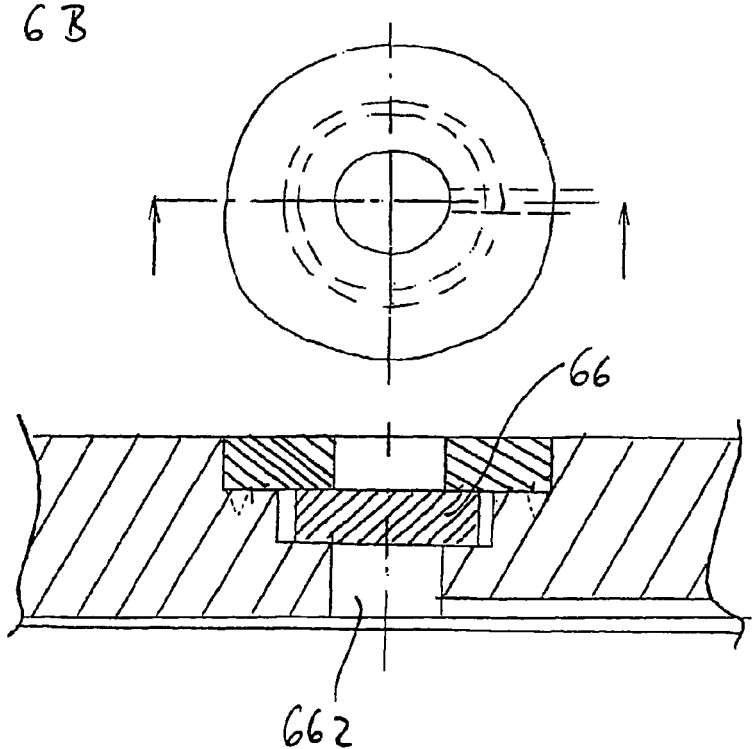

MICRO-VALVE AND SEALING DEVICE FOR USE IN A MICROFLUIDIC SYSTEM, AND METHOD FOR THE PRODUCTION THEREOF

FIELD OF THE INVENTION

The invention concerns a microvalve for control of fluid streams and a sealing device for the sealing of cavities in a microfluidics system, especially in a lab-on-a-chip system as well as a method for its production. The microvalve has a substrate with a sealing surface and a valve body disposed movably relative to the substrate, which has a sealing surface and defines at least one channel for optional connection and/or separation of fluid lines in the substrate, wherein the sealing surface of the valve body and the sealing surface of the substrate lie against each other in a fluid-tight manner. The sealing device has a substrate with a sealing surface and a sealing element, having a sealing surface for sealing off a cavity in the substrate. The invention further relates to a sample processing chip with such a microvalve and/or such a sealing device.

A sample processing chip in the sense of this invention is a microfluidic system for chemical and biochemical analysis and/or synthesis, for example, for so-called point-of-care applications. These microfluidic systems are also termed lab-on-a-chip.

By sealing element in the sense of this invention is generally meant a nonpermeable element sealing off the cavity (channel, reservoir, chamber) from the surroundings of the substrate, or at least selectively sealing it off, e.g., for selected substances, especially a septum, a membrane, a filter element or the like. The sealing element can thus take on other functions in addition to the (selective) sealing function. For example, it can be air or gas-permeable for venting of the cavity. In contrast with the valve body, which given its function is movable relative to the substrate, the sealing element can be connected immovably to the substrate.

BACKGROUND OF THE INVENTION

Microvalves of the kind mentioned above are known. For example, reference is made to the patent application laid open DE 102 27 593 A1, the U.S. Pat. No. 6,748,975 B2 and the article "10-Way micro switching valve chip for multi-directional flow control", Tadahiro Hasegawa et al, 7th International Conference on Miniaturized Chemical and Biochemical Analysis Systems, 5-9 Oct. 2003, Squaw Valley, Calif. USA.

From DE 102 27 593 A1, for example, there is known a microvalve, which has a substrate and a cover plate as valve body, which have contact surfaces lying against each other in fluid-tight contact and can be positioned relative to each other so that fluid lines can be optionally connected or separated. The microvalve is disclosed as being either a rotary valve with a cylindrical cover plate or a slide valve with a rectangular cover plate. Polymer materials and optionally composite materials are proposed preferably as the substrate and cover plate material.

The present invention deals with the question of how to create a simple and functionally reliable connection of the valve body and the sealing element to the substrate, as in such microvalves. Since the aforementioned microfluidics systems and especially the lab-on-a-chip systems are generally designed for onetime use, a low-cost solution is desirable. DE 102 27 593 A1 offers no clues for this.

In U.S. Pat. No. 6,748,975 B2 is disclosed a rotary valve, which is formed by a valve body (or rotor) which can turn relative to the substrate (or stator). The rotor can turn between two or more valve positions, in which one or more channels in the rotor optionally connects one or more inlet openings with one or more outlet openings, or separates these. The rotor lies by one contact surface on a corresponding contact surface of the stator. The position of the rotor with respect to the stator is defined by inserting the two elements in a valve housing, which besides the rotor and the stator includes various means for pressing on and activating the valve. Even though the rotor and the stator are loose parts in this case and seem suitable for onetime use, still a considerable expense is required to assembly the functional valve and thus the manipulation of the valve become more difficult.

A rotary valve consisting of a substrate and a rotating valve body is also pointed out in the aforementioned article by Hasegawa et al., which lie against each other by their contact surfaces. The valve body is formed from a silicone rubber ring with channels worked into it, which is pressed against the substrate by means of a mechanism consisting of at least four parts, including a pressing spring. Just how the pressing spring is buttressed against the substrate is not evident from the article. Here as well, it is to be assumed that an enclosing valve housing is provided, which receives the valve arrangement.

The inventor itself has already presented microvalve arrangements with a substrate 10 and a valve body 12 of the aforementioned kind at the conference "MipTec—The 9th International Conference and Exhibition on Drug Discovery" on 9 May 2006, as described hereafter by means of FIG. 1. The valve body 12 is in the form of an elastomer seal and is pressed by its contact or sealing surface 14 against a corresponding contact or sealing surface 16 of the substrate 10 via a valve cylinder 18. The valve cylinder 18 is fashioned in the form of a plunger and has a pressing force applied to it by means of a compression spring 20. The compression spring 20 in turn thrusts against a housing 22, which is screwed directly onto the substrate 10 by means of a screw connection 24. The microvalve arrangement of FIG. 1 is of simple construction when compared to the aforesaid prior art, yet still a multitude of different materials and components are needed and the onetime assembly is still too elaborate in practice for a mass production.

SUMMARY OF THE INVENTION

The problem of the present invention, accordingly, is to improve a microvalve as well as a sealing device of the aforementioned kind so that it can be produced with low effort and thus with low costs. Accordingly, the problem of the invention is to provide a method for the production of such a microvalve or a corresponding cover device that is more economical and thus suited for the mass production of disposable products.

The problem is solved by a microvalve with a substrate having a sealing surface, and a valve body arranged movably relative to the substrate, having a sealing surface and defining at least one channel for the optional joining and/or separating of fluid lines in the substrate, wherein the sealing surface of the valve body and the sealing surface of the substrate lie fluid-tight against each other, wherein the valve body is pressed by means of a pressing ring joined by a material connection to the substrate against the sealing surface of the substrate by its sealing surface and the pressing ring and/or the valve body is at least partly elastic, a sealing device with a substrate having a sealing surface, and a sealing element, having a sealing surface for sealing a cavity in the substrate, wherein the sealing element is pressed by means of a pressing ring joined by material connection to the substrate fluid-tight against the sealing surface of the substrate by its sealing surface and the pressing ring and/or the sealing element is at least partly elastic, as well as a method for making a microvalve or a sealing device in a microfluidics system, especially in a lab-on-a-chip system, wherein a valve body or a sealing element with a sealing surface is placed on a sealing surface of a substrate, the valve body or the sealing element is pressed by means of a pressing ring fluid-tight against the sealing surface of the substrate by its sealing surface, and the pressing ring is joined to the substrate by a material connection. Advantageous modifications of the invention are the subject of the subclaims.

In the microvalve according to the invention, the valve body is pressed by its sealing surface in form-fitting manner against the sealing surface of the substrate by means of a pressing ring joined in a material connection to the substrate and the pressing ring and/or the valve body is at least partly elastic.

The inventors have discovered that the construction of the microvalve according to the invention is likewise suitable for simple and economically favorable assembly of other sealing elements with sealing function. In a sealing device according to the invention for the sealing of cavities with a sealing element of the kind described above, the sealing element is pressed by its sealing surface against the sealing surface of the substrate by means of a pressing ring joined by a material connection to the substrate in fluid-tight manner, while the pressing ring and/or the sealing element are at least partially elastic.

The method according to the invention for production of the microvalve or the sealing device in a microfluidics system, especially in a lab-on-a-chip system, calls for placing a valve body or a sealing element with a sealing surface on a sealing surface of a substrate, pressing the valve body or the sealing element by its sealing surface fluid-tight against the sealing surface of the substrate by means of a pressing ring, and joining the pressing ring by a material connection to the substrate.

While thus far the only valve arrangements known are those assembled from at least six individual parts and needing to be assembled in a corresponding number of individual steps, only three parts are provided for the microvalve of the invention or for the sealing device of the invention, namely, the substrate, the valve body and the pressing ring. These three elements are put together in a simple work step, in which they are stacked one on the other and fixed by a material connection between the pressing ring and the substrate. Here, the pressing ring and/or the valve body or the sealing element functionally replace the spring. The pressing ring, which supports the valve body or the sealing element relative to the substrate on its side away from the sealing surface, also functionally replaces the much more complicated to fabricate housing. The pressing ring can be made as a simple injection molded part, or a plastic extrusion-coated metal or stamped part (e.g., of spring plate). The valve body can also be made as a simple part, such as a disk-shaped part, in one or at least a few work steps. The microvalve of the invention and the sealing device of the invention totally do without the use of a spring to generate the pressing force. For this purpose, the invention makes use of the (partial) elasticity of the valve body or sealing element and/or the pressing ring. For this there needs to be a suitable choice of material for the valve body or the sealing element and/or the pressing ring, taking into account the geometry of the particular structural part, so that a sufficient elasticity and, thus, pressing force is assured for the sealing.

In one advantageous modification, the valve body or the sealing element is compressive-elastic. Alternatively or additionally, the pressing ring is flexural-elastic, at least for a segment.

The former can be achieved preferentially in that the valve body or the sealing element consists at least partly of an elastomer. Especially suitable materials are thermoplastic elastomers, silicones, fluoroelastomers such as Viton®, ethylene-propylene-diene rubber, styrene-butadiene rubber (SBR), ethylene-propylene rubber (EPM) or nitrile rubber.

The latter can be achieved preferentially in that the pressing ring consists of an injection-molded partly elastic plastic or a plastic extrusion-coated spring steel. Specially suitable plastics are thermoplasts and duroplasts, especially acrylonitrile-butadiene-styrene copolymerizate (ABS), polyoxymethylene (POM), polyether ketones (PEEK).

Especially preferably, the valve body has a shape-stable part and an elastomer seal, on which the sealing surface is formed, whereby a pressing force from the pressing ring acts across the shape-stable part on the elastomer seal.

The shape-stable part ensures a uniform distribution of the pressing force over the entire sealing surface of the elastomer seal, while the latter due to its elasticity is compressed and provides a sufficient sealing.

In one advantageous modification, the shape-stable part together with the elastomer seal is produced by two-component injection molding.

In this way, the shape-stable part, which in this embodiment preferably consists of a shape-stable plastic, and the elastomer seal are combined into a single valve body, which reduces the assembly expense. Also, the production of a two-component injection-molded part is relatively economical.

Advantageously, the at least one channel in the elastomer seal is formed as a through opening.

This embodiment of the invention has the advantage of easy workmanship. Channels in the form of depressions or grooves, if the valve body is not finished by injection molding, are produced or added subsequently in familiar fashion by etching, laser ablation, spray engraving, hot engraving, milling or the like. On the other hand, the channel in the form of a through opening can be produced in a single stamping process and a valve body with such an elastomer seal is therefore more favorable.

This sealing element in one preferred embodiment is joined by a material connection to the pressing ring. This embodiment can be achieved, for example, by a joint production of both elements in a two-component injection molding process or by subsequent gluing of the two elements and it facilitates the assembly process.

The microvalve can preferably be fashioned as a rotary valve or a slide valve.

The material connection between the substrate and the pressing ring in the microvalve of the invention or the sealing device of the invention is preferably created by a welding connection. Again preferably, the pressing ring and the substrate are joined together by ultrasound welding or by laser welding. Ultrasound welding has the advantage that the parts being joined are pressed together in a defined position and fixed precisely in this arrangement.

In an especially preferred embodiment of the microvalve or the sealing device, the sample processing chip forms the substrate.

The microvalve or the sealing device on account of their simple makeup are easy to miniaturize. The functional components of valve and/or sealing device can therefore be arranged with higher density on the microfluidic chip. It is also possible to use both sides of a chip for mounting. In this way, even higher integration densities and more complex channel structures and thus an improved functionality can be achieved for the same footprint on a chip.

The microvalve or sealing device of the invention, especially when combined with a recessed seat, can be integrated fully in the sample processing chip when the valve seat or the seat for the sealing element is worked so deep in the form of a recess into the sample processing chip that the valve body can be set fully in the processing chip. Moreover, the a recess or depression can also be provided for the pressing ring in the sample processing chip, enabling a flush closure of the pressing ring with the surface of the sample processing chip. In this way, the integration density of the functional components is further increased and the chip is given a flat profile, even when the functional components of valve and/or sealing device are mounted on both sides.

BRIEF DESCRIPTION OF THE DRAWINGS

Further problems, features and benefits of the invention will now be explained more closely by means of sample embodiments with the help of the drawings. There are shown:

FIG. 3, three sectional views of a first embodiment of the microvalve of the invention;

FIG. 5, three sectional views of a third embodiment of the microvalve of the invention, and FIG. 6, two sectional views of a sample embodiment of the sealing device of the invention.

DETAILED DESCRIPTION OF THE INVENTION

Figure 1:
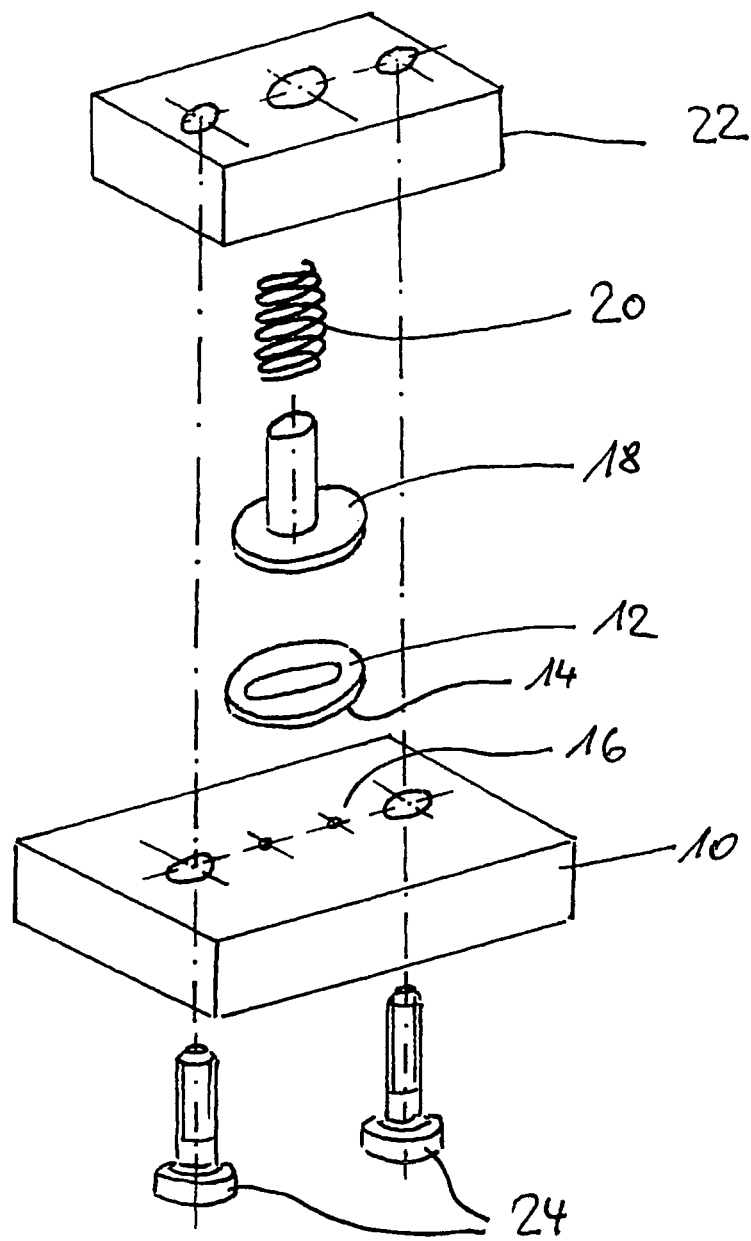
FIG. 1, a microvalve of familiar design.
Figure 2:
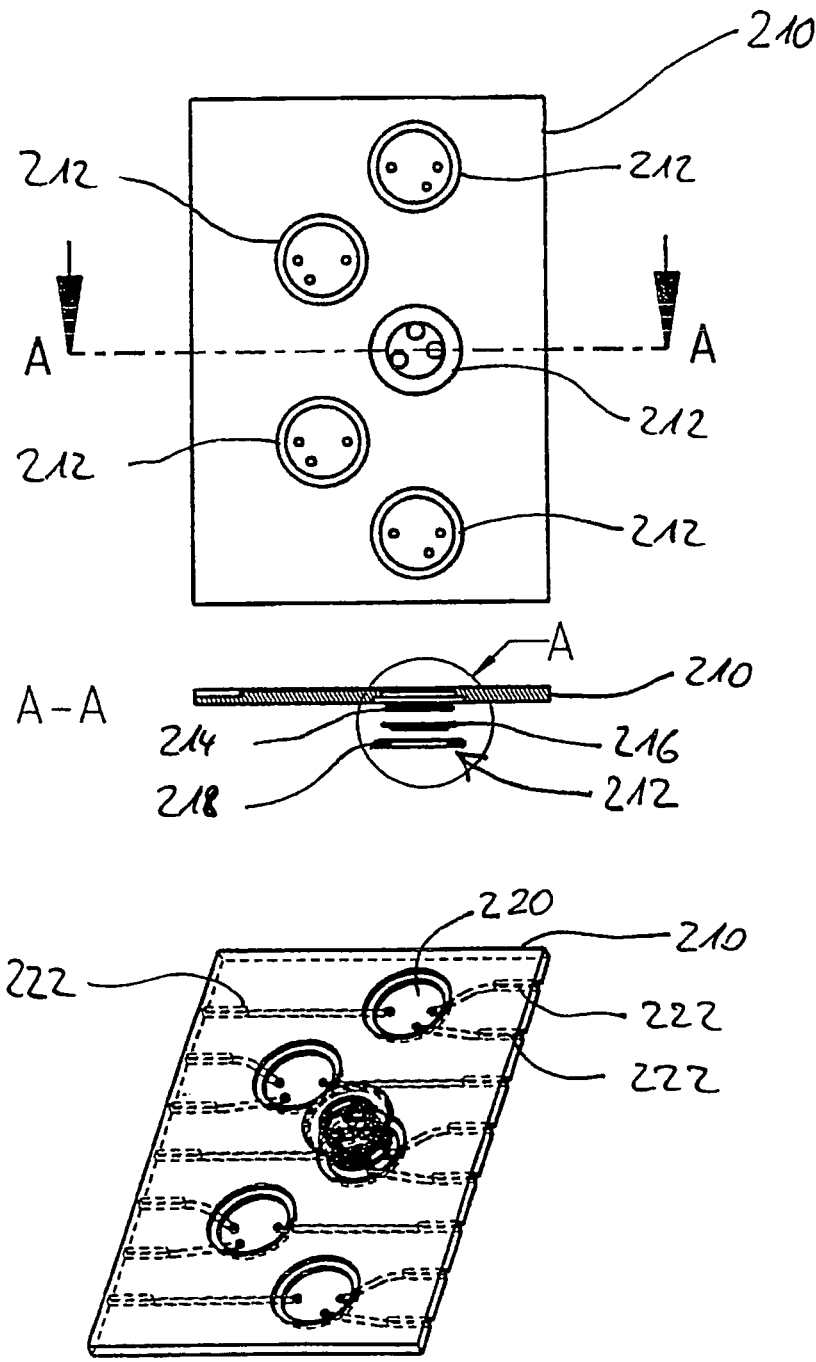
FIG. 2, a sample processing chip with the valve of the invention in three views.

FIG. 2 shows a sample processing chip 210 according to the invention in three views, which at the same time constitutes the substrate for five microvalves 212 of the invented kind. The microvalves 212 are configured as rotary valves. In this embodiment, they have an elastomer seal 214 and a shape-stable part 216, which together form the valve body. The valve body is forced by means of a pressing ring 218 against a base and sealing surface 220 in the valve seat in the substrate 210. The valve seat is fashioned as a stepped cylindrical hollow in the substrate 210. The deeper step of the hollow forms the actual valve seat with the sealing surface 220. The shallower hollow with larger diameter forms the seat for the pressing ring 212, so that the entire installation consisting of valve body and pressing ring closes off the surface of the substrate 210 flush. At the bottom of FIG. 2 one notices that fluid lines 222 extend through the substrate 210, which empty into the valve seat in general and into the sealing surface 220 of the valve seat in the specifically illustrated example. The function of the valve body is to optionally join or separate these emptying points. For this purpose, at least one or more channels are provided at least in the elastomer seal 214 in the valve body, in the embodiment shown, which communicate for example with none, with one, two or all three emptying points, depending on the position of the valve.

The sample embodiment shown in FIG. 2 is to be taken only as a sample embodiment. Of course, the invention also covers valves that have more or fewer emptying points. In particular, it also covers those sealing devices that have only a single emptying point or cavity in the region of the sealing surface. In departure from the embodiment shown, the lines 222 can also empty laterally (radially in regard to the valve axis) into the valve seat, for example.

FIGS. 3A-3C show in enlarged view a section through a sample embodiment of the microvalve of the invention, namely, in sequence, an exploded view (FIG. 3A), an assembled view in a first valve position (FIG. 3B) and an assembled view in a second valve position (FIG. 3C). Furthermore, the valve positions are also illustrated in top view in the details of FIGS. 3B and 3C.

The sample processing chip 310 is shown only in a segment. It consists of a rather substantial support plate 324, in which the valve seat 326 is made from the top side and the fluid lines 322 from the lower side. The sample processing chip 310, furthermore, is closed with a film 328 from the lower side.

The valve seat 326 is made in the form of a two-step shallow borehole in the support plate 324. The lower step 330 forms the actual valve seat with the base and sealing surface 320. The upper step 332 forms the seat for the pressing ring 318.

The valve body 334, as described above, is assembled from a shape-stable part 316 and an elastomer seal 314. The elastomer seal 314 has a sealing surface 336 on its lower side, by which it lies in the assembled condition on the sealing surface 320 of the substrate 310 or the support plate 324. In the elastomer seal 314, a channel 338 is provided for the optional connecting or separating of the fluid lines 322 depending on valve position. In FIG. 3B the horizontal valve position is shown, in which the fluid lines 322 are joined to each other by the channel 338; in FIG. 3C the vertical or blocking position of the valve is shown, in which the fluid lines 322 are not connected by the channel 338. The channel 338 in this embodiment is fashioned entirely in the elastomer seal 314 as a depression. The shape-stable part 316 of the valve body 334 is flat on its lower side and does not make contact with the fluid.

The elastomer seal 314 provides the needed elasticity and thus compressibility of the valve body 334, so that this can be pressed with sufficient strength by means of the pressing ring 318 in the assembled condition against the sealing surface 320 so that the contact surfaces 336, 320 lie fluid-tight against each other. On the other hand, the pressure should not be so strong that the resulting friction between the two contact surfaces makes it impossible for the valve body 334 to rotate under reasonable expenditure of force. The latter can be achieved by an appropriately adjusted excess thickness of the valve body as compared to the depth t of the actual valve seat 330.

The material connection between the pressing ring 318 and the substrate 310 or the support plate 324 according to the invention is achieved in this sample embodiment by ultrasound welding. For this purpose, the pressing ring 318 has a ring-shaped shoulder 340 on its lower side, whose material enters into a material connection with the material of the support plate 324 during the ultrasound welding.

The valve body 334 and more precisely the shape-stable part 316 of the valve body 334 has at its upper end a cylindrical shoulder 342, which is introduced into a corresponding borehole 344 in the pressing ring 318. The dimensions of the shoulder 342 in relation to the outer diameter of the valve body 334 and thus the upper annular surface of the shape-stable part 316, allowing for the material composition, determine the frictional force between the valve body 334 and the pressing ring 318. In the cylindrical shoulder 342 there is provided a recess 346, serving as a handle for activating the rotary valve 312. The recess can be fashioned, for example, in the form of a hexagonal socket or the like for activation by means of an appropriate screwdriver.

Figure 4A:
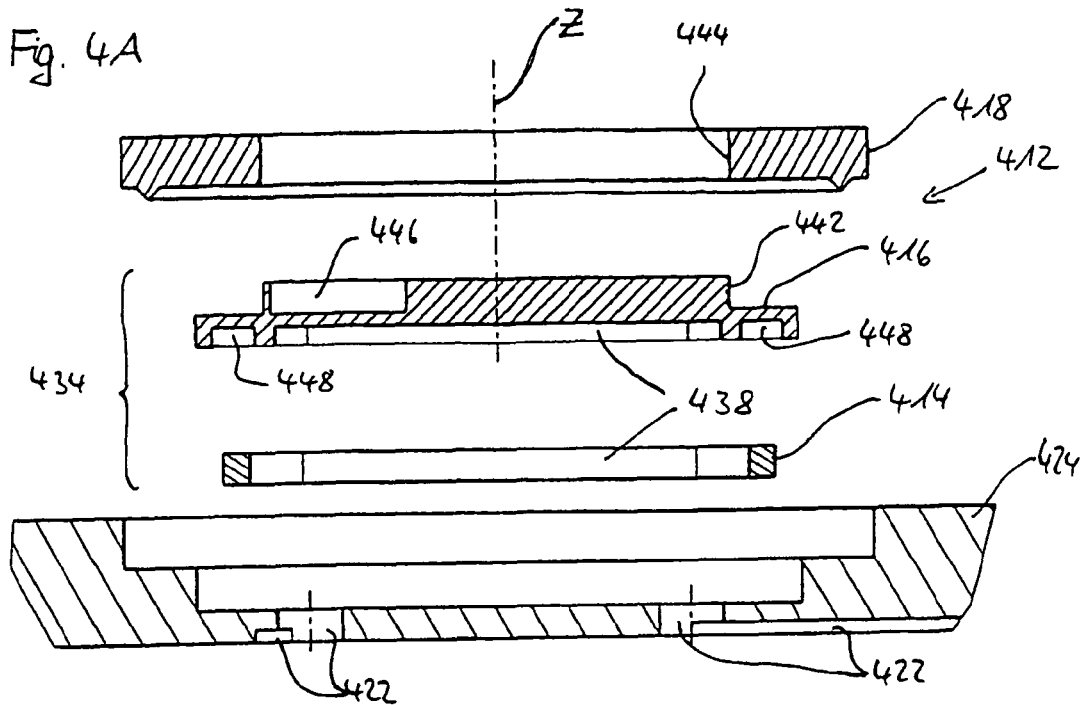
FIG. 4, three sectional views of a second embodiment of the microvalve of the invention.
Figure 4B:
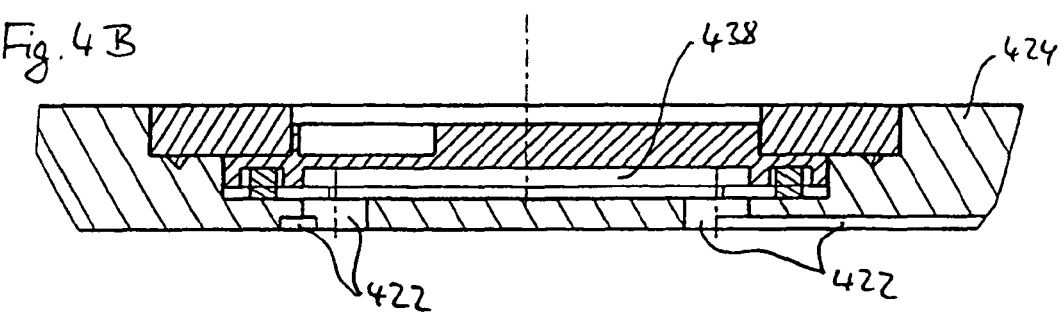
Figure 4C:
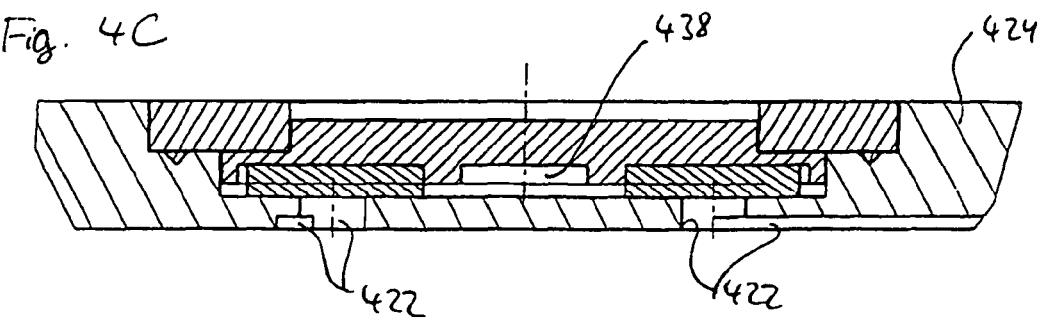

In FIGS. 4A to C is shown a second sample embodiment of the invented microvalve, which is essentially distinguished by a different form of the valve body 434, in that although it is assembled in two pieces from a shape-stable part 416 and an elastomer seal 414, the elastomer seal 414 has less structural height and the channel 438 is fashioned as a through opening in the elastomer seal 414. Such an elastomer seal can be made in simple fashion by punching out from a band of material. The channel 438 furthermore extends partly into the shape-stable part 416, so as to provide on the whole an adequate cross section for the joining of the two fluid lines 422 in the substrate (only the massive support plate 424 is shown in FIG. 4).

Another difference regarding the valve body 434 is that the shape-stable part 416 also has on its lower side a recess 448 to partially receive the elastomer seal 414. This is advantageous in cases where the elastomer seal 414 has a slight cross if only in one section, as is depicted in FIGS. 4A and 4B. The recess 448 serves here as a guide or to stabilize the elastomer seal 414, which due to its elasticity might otherwise get shifted, skewed, or even destroyed when the valve is activated.

The shape-stable part 414 again has a cylindrical shoulder 442, which fits into a corresponding central borehole 444 in the pressing ring 418. The shoulder 442 has a larger diameter in this sample embodiment and a recess 446 on its top side, which is arranged off center to the center axis Z. The recess 446, as in the example of FIG. 3, serves to activate the rotary valve 412, but in this case it can be activated as a recessed grip, with the finger, for example.

FIGS. 5A to 5C show another sample embodiment of the invented microvalve, which in contrast with the two previous ones is configured not as a rotary valve, but rather a sliding valve 512. Accordingly, all parts of the valve 512, namely, the pressing ring 518, the shape-stable part 516 of the valve body 534, the elastomer seal 514 and also the valve seat 526 in the support plate 524 of the substrate 510, are designed for a translatory movement of the valve body 534.

Even though a channel 538 is also fashioned here as a through opening in the elastomer seal 514, unlike the sample embodiment of FIG. 4 the channel 538 does not extend into the shape-stable part 516. The lower side of the shape-stable part 516 of the valve body has only an outer peripheral edge 550 to stabilize or guide the elastomer seal 514. In this case, there is no inner circumferential edge that would also constitute a limit for the channel 538.

The elastomer seal 514 in the valve position shown in FIG. 5B closes by its sealing surface 536 the right fluid line 522. Thus, only the left fluid line 522 has a connection to the channel 538. A communication of the two fluid lines does not occur. On the contrary, in the valve position per FIG. 5C, the two fluid lines 522 are joined to each other by the channel 538.

The pressing ring 518, as can be seen from FIG. 5C, has a rectangular outer contour with rounded corners. Optionally, however, the pressing ring can also have a round outer contour in a sliding valve, where the elongated groovelike recess 544 preferably has parallel sides in the activating direction for better guiding of the valve body 534.

In FIGS. 6A to 6C, a sample embodiment of the invented sealing device 612 is shown, with a substrate 610, a sealing element 660 and a pressing ring 618. The substrate 610, as in the preceding sample embodiments, constructed from a support plate 624, in which are made the seat 626 for the sealing element 660 from the top side and a fluid line 622 from the lower side, as well as a film 628 to seal the support plate 624 from the lower side. The fluid line 622 empties in the form of a wide cavity 662 through the base and sealing surface 620 into the actual seat 630 for the sealing element 660. The sealing element 660 seals off the cavity 662 at the top side by pressing it with its lower sealing surface 636 via the pressing ring 618 against the sealing surface 620 in the assembled state, see FIG. 6B.

In the sample embodiment of FIG. 6, the sealing element 660 is configured as fully elastic material, i.e., as a single piece of elastomer. The elasticity to achieve the pressing force needed for a sealing is therefore provided solely from the sealing element 660. The pressing ring 618 is sufficiently stiff to buttress the sealing element 660 against the support plate 624.

The pressing ring 618 has a central borehole 644, enabling access to the sealing element 660, for example, acting as a septum for removal of fluid from the cavity 662 by means of a cannula from the outside.

In terms of providing the pressing force, all sample embodiments shown are identical in that the necessary elasticity is provided only by the valve body or the sealing element and not by the pressing ring. The valve bodies of FIGS. 3, 4 and 5 differ from the sealing device of FIG. 6 in that the elasticity in these cases is provided by only a part of the valve body, namely, the elastomer seal, while the shape-stable part and the pressing ring in all three sample embodiments are so stiff that they do not yield significantly under the pressing force. The shape-stable part of the valve body ensures that the pressing force is uniformly distributed over the elastomer seal.

In departure from the sample embodiments shown, however, a portion of the elasticity can also be provided by the pressing ring, in that this is designed in terms of its material and geometry according to the elasticity requirements, so that it can partly yield when a force is exerted. Thus, the elasticity-related restoring force can be distributed among the valve body or the sealing element and the pressing ring.

In departure from the sample embodiments shown, it is furthermore possible, similar to the configuration of FIG. 6, to configure the valve body as a single fully elastic element, provided that it has enough natural stability to fulfill the desired sealing function. For example, in the form of a ceramic filter, the sealing element can also be inelastic. In this case, the required elasticity to generate a sufficient pressing force comes solely from the pressing ring. The same holds in theory for the valve body.

In all sample embodiments shown, an embodiment is chosen in which the material connection between the pressing ring and the support plate of the substrate is created by means of ultrasound welding. But the invention likewise applies to embodiments in which the material connection is achieved, e.g., by gluing, solvent gluing, laser welding or other forms of welding.

The shape-stable part and the elastomer seal can basically be joined by form-fit, friction connection, and material connection. As already mentioned, both parts of the valve body can be produced in a joint two-component injection molding. Alternatively, they can be produced separately and glued together. In departure from the sample embodiments depicted, a form fit can also be achieved by dogs in the form of projections on the shape-stable part, which engage with corresponding recesses in the elastomer seal or vice versa.

LIST OF REFERENCE NUMBERS

10 Substrate/sample processing chip
12 Elastomer seal

14 Sealing surface
16 Sealing surface
18 Valve cylinder
20 Compression spring
22 Valve housing
24 Screw/screw connection
210 Substrate/sample processing chip
212 Microvalve
214 Elastomer seal
216 Shape-stable part of valve body
218 Pressing ring
220 Sealing surface
222 (Fluid) line
310 Substrate/sample processing chip
312 Microvalve
314 Elastomer seal
316 Shape-stable part of valve body
318 Pressing ring
320 Sealing surface
322 (Fluid) line
324 Support plate
326 Valve seat
328 Film
330 Lower step, valve seat proper
332 Upper step, seat
334 Valve body
336 Sealing surface
338 Channel
340 Ring-shaped shoulder
342 Cylindrical shoulder
344 Borehole
346 Recess
410 Substrate/sample processing chip
412 Microvalve
414 Elastomer seal
416 Shape-stable part of valve body
418 Pressing ring
422 (Fluid) line
424 Support plate
434 Valve body
438 Channel
442 Cylindrical shoulder
444 Borehole
446 Recess
448 Recess/seat
510 Substrate/sample processing chip
512 Microvalve
514 Elastomer seal
516 Shape-stable part of valve body
518 Pressing ring
522 (Fluid) line
524 Support plate
526 Valve seat
534 Valve body
536 Sealing surface
538 Channel
544 Borehole
550 Outer peripheral edge
610 Substrate/sample processing chip
612 Sealing device
618 Pressing ring
620 Sealing surface
622 (Fluid) line
624 Support plate
626 Valve seat
628 Film
630 Valve seat proper
636 Sealing surface
644 Borehole
660 Sealing element
662 Cavity
Z Center axis

What is claimed is:

1. A sample processing chip, comprising: a microvalve for the control of fluid streams in a microfluidic system, a substrate, having a sealing surface, and a valve body arranged movably relative to the substrate, having an elastomer seal with a sealing surface, the elastomer seal provided with at least one channel for the optional joining and/or separating of fluid lines in the substrate depending on a position of the valve body, wherein the sealing surface of the valve body and the sealing surface of the substrate lie fluid-tight against each other,
wherein the sample processing chip is a planar support plate with fluid lines extending therethrough and wherein the sample processing chip forms the substrate of the microvalve,
wherein a pressing ring is directly joined by a material connection to the substrate,
the pressing ring being formed as a single piece and
the pressing ring being in direct contact with the valve body,
wherein the sealing surface of the valve body is pressed by the pressing ring against the sealing surface of the substrate,
wherein the pressing ring and the valve body are both at least partly elastic, and wherein the microvalve is free of a spring,
wherein the sealing surface of the substrate and the sealing surface of the valve body are flat surfaces, wherein the pressing ring applies pressure to the valve body in a direction perpendicular to the substrate sealing surface and the valve body sealing surface, and
wherein a first fluid line in the substrate enters from a first side of the substrate into the at least one channel of the valve body and a second fluid line exits from the same, first side of the substrate from the channel of the valve body.

2. The sample processing chip according to claim 1, wherein the valve body is compressive-elastic.

3. The sample processing chip according to claim 2, wherein the valve body consists at least partly of an elastomer.

4. The sample processing chip according to claim 3, wherein the valve body has a shape-stable part and an elastomer seal, on which the sealing surface is fashioned, while a pressing force from the pressing ring acts on the elastomer seal via the shape-stable part.

5. The sample processing chip according to claim 4, wherein the shape-stable part is made together with the elastomer seal by two-component injection molding, wherein the pressing ring and the substrate are welded to each other.

6. The sample processing chip according to claim 4, wherein the at least one channel in the elastomer seal is fashioned as a through opening.

7. The sample processing chip according to claim 1, wherein the pressing ring is flexural-elastic.

8. The sample processing chip according to claim 1, wherein a valve seat is recessed in the substrate.

9. The sample processing chip according to claim 1, wherein the pressing ring and the substrate are welded to each other.

10. The sample processing chip according to claim 1, wherein the first side of the substrate is opposite a second side that is adjacent the pressing ring.

11. The sample processing chip according to claim 1, wherein the pressing ring supports the valve body relative to the substrate on a side away from the valve body sealing surface.

12. The sample processing chip according to claim 1, wherein the substrate has a valve seat formed as a stepped, cylindrical hollow.

13. The sample processing chip according to claim 1, wherein the valve body and pressing ring close off the surface of the substrate flush.

14. A method for making a sample processing chip, comprising the steps of: placing a valve body having an elastomer seal with a sealing surface on a sealing surface of a substrate formed by the sample processing chip, the elastomer seal provided with at least one channel for the optional joining and/or separating of fluid lines in the substrate depending on a position of the valve body, pressing the sealing surface of the valve body or the sealing element by a pressing ring fluid-tight against the sealing surface of the substrate without making use of a spring, the pressing ring being formed as a single piece and the pressing ring being in direct contact with the valve body or sealing element, and joining the pressing ring directly to the substrate by a material connection,
  wherein the sealing surface of the substrate and the sealing surface of the valve body are flat surfaces, wherein the pressing ring applies pressure to the valve body in a direction perpendicular to the substrate sealing surface and the valve body sealing surface,
  wherein the substrate is a planar support plate, and
  wherein a first fluid line extending through the substrate enters from a first side of the substrate into the at least one channel of the valve body and a second fluid line extending through the substrate exits from the same, first side of the substrate from the channel of the valve body.

15. The method according to claim 14, wherein the pressing ring is welded to the substrate.

16. The method according to claim 15, wherein the pressing ring is joined to the substrate by ultrasound welding.

17. The method according to claim 15, wherein the pressing ring is joined to the substrate by laser welding.

18. A sample processing chip, comprising: a microvalve for the control of fluid streams in a microfluidic system, a substrate, having a sealing surface, and a valve body arranged movably relative to the substrate, having an elastomer seal with a sealing surface, the elastomer seal provided with at least one channel for the optional joining and/or separating of fluid lines in the substrate depending on a position of the valve body, wherein the sealing surface of the valve body and the sealing surface of the substrate lie fluid-tight against each other,
  wherein the sample processing chip is a planar support plate with fluid lines extending there through and forms the substrate of the microvalve,
  wherein a pressing ring is directly joined by gluing or welding to the substrate,
  the pressing ring being formed as a single piece and
  the pressing ring being in direct contact with the valve body,
  wherein the sealing surface of the valve body is pressed by the pressing ring against the sealing surface of the substrate,
  wherein the pressing ring and the valve body are both at least partly elastic, and wherein the microvalve is free of a spring,
  wherein the sealing surface of the substrate and the sealing surface of the valve body are flat surfaces, wherein the pressing ring applies pressure to the valve body in a direction perpendicular to the substrate sealing surface and the valve body sealing surface, and
  wherein a first fluid line in the substrate enters from a first side of the substrate into the at least one channel of the valve body and a second fluid line exits from the same, first side of the substrate from the channel of the valve body.

19. A sample processing chip comprising a microvalve for the control of fluid streams in a microfluidic system, a substrate, having a sealing surface, and a valve body arranged movably relative to the substrate, having an elastomer seal with a sealing surface, the elastomer seal provided with at least one channel for the optional joining and/or separating of fluid lines in the substrate depending on a position of the valve body, wherein the sealing surface of the valve body and the sealing surface of the substrate lie fluid-tight against each other,
  wherein the sample processing chip is a planar support plate with fluid lines extending there through and forms the substrate of the microvalve,
  wherein a valve seat is recessed in the substrate,
  wherein a pressing ring is directly joined by a material connection to the substrate,
  the pressing ring being formed as a single piece,
  the pressing ring being in direct contact with the valve body,
  wherein the valve body and pressing ring closes off the surface of the substrate flush,
  wherein the sealing surface of the valve body is pressed by the pressing ring against the sealing surface of the substrate,
  wherein the pressing ring and the valve body are both at least partly elastic, and
  wherein the microvalve is free of a spring,
  wherein the sealing surface of the substrate and the sealing surface of the valve body are flat surfaces, wherein the pressing ring applies pressure to the valve body in a direction perpendicular to the substrate sealing surface and the valve body sealing surface,
  wherein a first fluid line in the substrate enters from a first side of the substrate into the at least one channel of the valve body and a second fluid line exits from the same, first side of the substrate from the channel of the valve body.

20. A sample processing chip comprising a microvalve for the control of fluid streams in a microfluidic system, a substrate, having a sealing surface, and a valve body arranged movably relative to the substrate, having an elastomer seal with a sealing surface, the elastomer seal provided with at least one channel for the optional joining and/or separating of fluid lines in the substrate depending on a position of the valve body, wherein the sealing surface of the valve body and the sealing surface of the substrate lie fluid-tight against each other,
  wherein the sample processing chip is a planar support plate with fluid lines extending there through and forms the substrate of the microvalve,
  wherein a pressing ring is directly joined by a material connection to the substrate,
  the pressing ring being formed as a single piece and
  the pressing ring being in direct contact with the valve body and supporting the valve body relative to the substrate on its side facing away from the sealing surface,
  wherein the sealing surface of the valve body is pressed by the pressing ring against the sealing surface of the substrate, wherein the pressing ring and the valve body are both at least partly elastic, and wherein the microvalve is free of a spring, wherein the sealing surface of the substrate and the sealing surface of the valve body are flat surfaces, wherein the pressing ring applies pressure to the valve body in a direction perpendicular to the substrate sealing surface and the valve body sealing surface, and wherein a first fluid line in the substrate enters from a first side of the substrate into the at least one channel of the valve body and a second fluid line exits from the same, first side of the substrate from the channel of the valve body.

21. A sample processing chip comprising a microvalve for the control of fluid streams in a microfluidic system, a substrate, having a sealing surface, and a valve body arranged movably relative to the substrate, having an elastomer seal with a sealing surface, the elastomer seal provided with at least one channel for the optional joining and/or separating of fluid lines in the substrate depending on a position of the valve body, wherein the sealing surface of the valve body and the sealing surface of the substrate lie fluid-tight against each other, wherein the sample processing chip is a planar support plate with fluid lines extending there through and forms the substrate of the microvalve, wherein a pressing ring is directly joined by gluing or welding to the substrate, the pressing ring being formed as a single piece and the pressing ring being in direct contact with the valve body and supporting the valve body relative to the substrate on its side facing away from the sealing surface, wherein the sealing surface of the valve body is pressed by the pressing ring against the sealing surface of the substrate, wherein the pressing ring and the valve body are both at least partly elastic, and wherein the microvalve is free of a spring, wherein the sealing surface of the substrate and the sealing surface of the valve body are flat surfaces, wherein the pressing ring applies pressure to the valve body in a direction perpendicular to the substrate sealing surface and the valve body sealing surface, and wherein a first fluid line in the substrate enters from a first side of the substrate into the at least one channel of the valve body and a second fluid line exits from the same, first side of the substrate from the channel of the valve body.

* * * * *